Nov. 12, 1940.　　　J. B. TUORO ET AL　　　2,221,158
SECTIONAL TROLLEY GUARD
Filed June 17, 1938
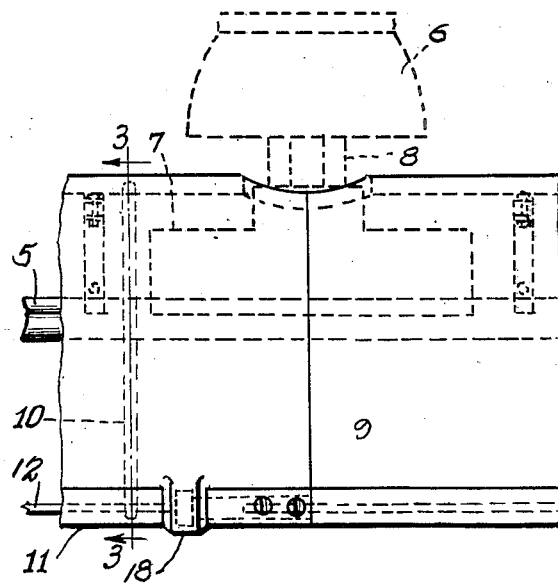
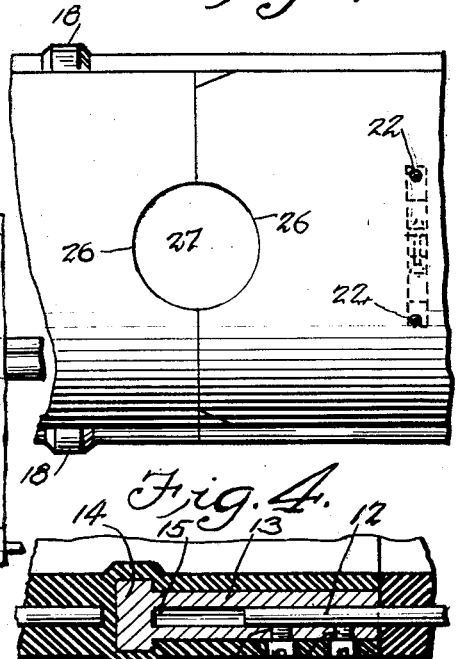
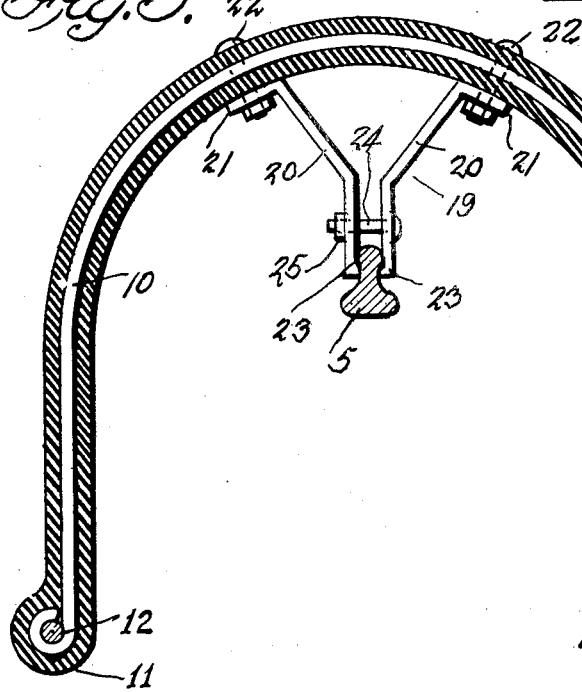
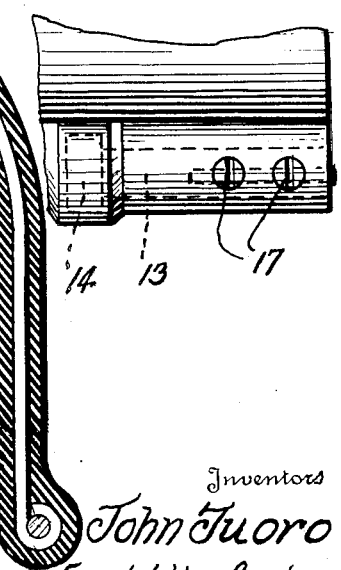
Inventors
John Tuoro
Frank L. Van Gorder
Hilding K. Anderson
By J. J. Trundle, Attorney Patented Nov. 12, 1940

2,221,158

UNITED STATES PATENT OFFICE 2,221,158

SECTIONAL TROLLEY GUARD

John B. Tuoro, Wakefield, Frank L. Van Gorder, Bessemer, and Hilding K. Anderson, Ironwood, Mich.

Application June 17, 1938, Serial No. 214,338

3 Claims. (Cl. 191—35)

This invention relates to improvements in trolley wire guards, and more particularly to trolley wire guards for use in mine tunnels.

The primary object of this invention is to provide a trolley wire guard adapted to partially cover the usual trolley conductor for preventing miners and others from contacting the trolley with their head or other body member.

Another object of this invention is to provide a trolley wire guard formed of suitable insulating material, preferably hard rubber so that should a person contact the guard he will not be electrocuted.

A further object of this invention is to provide a trolley guard of the above mentioned character formed in detachable sections, whereby the sections may be readily and easily installed without requiring skilled mechanics and can be disassembled for transportation to new locations after a mine tunnel has been abandoned.

A still further object of this invention is to provide a trolley wire of the above mentioned character adapted to be formed in sections and having detachable connecting means carried by the longitudinal edges of the guard including alternate male and female socket members.

A still further object of this invention is to provide a trolley wire guard of the above mentioned character having intermediate supporting brackets capable of being detachably connected to the trolley at spaced intervals whereby the individual sections may be readily secured to and removed from a mine or other type trolley conductor.

A still further object of this invention is to provide a trolley wire guard of the above mentioned type in which are formed semi-circular openings at each end so that when the meeting edges of the guard are placed together an opening will be formed for the passage of the trolley supporting insulators which suspend the trolley from the mine roof or supporting surface.

A still further object of this invention is to provide a trolley wire guard of the above mentioned character in which a reenforcing rod is embedded in the longitudinal edges of the guard and extends beyond the end of the guard to be received in an adjacent socket member embedded in the opposite end of an adjoining guard section.

Other objects and advantages of the invention will become apparent during the course of the following description taken with the drawings wherein, Fig. 1 is a side elevational view of the trolley wire guard embodying this invention, illustrating the same applied to a mine trolley and showing the manner in which the guard sections are connected along their longitudinal edges.

Fig. 2 is a top elevational view of the same illustrating the semi-circular openings formed in the certain meeting edges of the adjoining units for accommodating the trolley supporting insulators.

Fig. 3 is a vertical cross sectional view taken on lines 3—3 of Fig. 1 looking in the direction of the arrows illustrating in detail the reenforcing longitudinal and transverse members embedded in the guard unit for the purpose of strengthening the guard and preventing breakage thereof.

Fig. 4 is a longitudinal cross sectional view showing one of the socket connecting members for receiving the extended end of one of the longitudinal reenforcing bars, and Fig. 5 is a fragmentary side elevational view of one of the socket members disclosing the fastening screws for anchoring the free end of the adjacent reenforcing bar.

In the drawing wherein for the purpose of illustrating the invention and wherein life reference characters will be employed throughout the same, the reference character 5 will generally be employed to designate a mine trolley suspended from a supporting bracket or the like by means of an insulator 6 having a trolley connector 7 attached thereto by means of a coupling 8.

The invention comprises a guard 9, arcuately curved in cross section and preferably formed of an insulating material such as a phenolic condensation product or hard rubber composition adapted to straddle the trolley 5 so that the trolley will be covered and the free edges will extend downwardly beyond the trolley.

It is intended to form the guard by means of a series of individual sections each having transverse reenforcing bars 10 having their free ends bent around longitudinal reenforcing bars 11 and anchored thereto. Certain reenforcing bars 11 do not extend entirely to one end of the guard but extend beyond the opposite end as at 12 to form a prong or male connector member.

The opposite end of the guard member will be provided with a socket member 13 embedded in the guard and having an enlarged end 14 for anchoring the socket 13 and preventing displacement relative to the free edge of the guard. Extending into the bore 15 of the socket member in transverse screw threaded openings 16 are set screws 17 adapted to engage the prong or male connector member 12 and lock the same in place.

It will be noted that alternate ends of the guard units are thereby provided with socket members to form a connection with the alternately extending prong portions 12 of the reenforcing bars 11, and that the enlarged head 14 on the socket members forms a boss 18 intermediate the ends of the guard members.

Each trolley wire guard unit may be provided with one or more trolley engaging supporting brackets 19 including strap arms 20 having their upper ends angularly bent as at 21 so that they may be anchored to the upper curved portion of the guard by means of bolts 22 extending through the angularly bent portion 21 and guard and held in place by nuts threaded on the free ends thereof. The opposite ends of the strap iron brackets 20 are provided with jaws 23 adapted to embrace the trolley 5 and be clamped thereon by means of a clamping bolt 24 extending through the jaws 23 and having a nut 25 threaded thereon for moving the jaws 23 into tight engagement with the trolley.

The sectional guard units which adjoin trolley supporting insulators 6 may be provided with only one bracket as 19 adjacent one end of the guard while the opposite end may be provided with a semi-circular opening formed by cutting the guard as at 26 so that when complementary edges are placed together, an opening 27 will be formed for the passage of the insulator coupling member 8 and a portion of the insulator connector member.

It is to be understood that certain sectional guard units will not require the openings and that a trolley guard supporting bracket 19 may be substituted in lieu thereof and that various changes in the shape, size and arrangement of parts may be resorted to without departing from the spirit of the invention or the scope of the subjoined claims.

What is claimed is:

1. A trolley wire guard comprising a series of sectional U-shaped guard units adapted to straddle a trolley in end to end fashion, means for holding each guard unit in spaced relation from the trolley, socket members embedded in one end of each guard unit, aligning rod members mounted in the edges of the guard unit and extending beyond the opposite ends thereof whereby the meeting edges of the guard units may be longitudinally connected, said rod and socket members extending substantially throughout the length of the sections and set screws carried by the socket members for locking the rod members in position.

2. A trolley wire guard, comprising a series of sectional U-shaped guard units adapted to straddle a trolley wire in end to end relation, socket members embedded in one end of each unit, longitudinal reinforcing rods carried by the longitudinal edges of the guard units and extending beyond the opposite end of each unit in alinement with the socket members, said rod and socket members extending substantially throughout the length of the sections and set screws for the socket members for holding the rod extensions of one guard unit in the socket member of an adjacent guard unit.

3. A trolley wire guard comprising a series of sectional U-shaped guard units adapted to straddle a trolley wire in spaced relation therefrom, socket members embedded in one end of each unit, longitudinally extending reinforcing rods embedded in the longitudinal edges of each unit having one end projecting slightly beyond the edge of the unit in alignment with the socket members, said rod and socket members extending substantially throughout the length of the sections and set screws carried by the socket members for engaging the rod extensions to thereby lock the units in series.

JOHN B. TUORO.
FRANK L. VAN GORDER.
HILDING K. ANDERSON.